US008749590B2

(12) United States Patent
Roosendaal et al.

(10) Patent No.: US 8,749,590 B2
(45) Date of Patent: Jun. 10, 2014

(54) DISPLAY DEVICE USING MOVEMENT OF PARTICLES

(75) Inventors: Sander Jurgen Roosendaal, Eindhoven (NL); Martinus Hermanus Wilhelmus Maria Van Delden, Eindhoven (NL); Mark Thomas Johnson, Eindhoven (NL); Alwin Rogier Martijn Verschueren, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 895 days.

(21) Appl. No.: 12/516,051

(22) PCT Filed: Nov. 27, 2007

(86) PCT No.: PCT/IB2007/054803
§ 371 (c)(1),
(2), (4) Date: May 22, 2009

(87) PCT Pub. No.: WO2008/065608
PCT Pub. Date: Jun. 5, 2008

(65) Prior Publication Data

US 2010/0060673 A1 Mar. 11, 2010

(30) Foreign Application Priority Data

Nov. 30, 2006 (EP) .................................... 06125050

(51) Int. Cl.
*G09G 5/10* (2006.01)
*G09G 3/34* (2006.01)
*G06F 3/038* (2013.01)

(52) U.S. Cl.
USPC ............................ 345/690; 345/107; 345/204

(58) Field of Classification Search
USPC ................................. 345/107–108, 204, 690
See application file for complete search history.

(56) References Cited

U.S. PATENT DOCUMENTS

| | | | | |
|---|---|---|---|---|
| 4,298,448 | A * | 11/1981 | Muller et al. | 359/296 |
| 6,639,580 | B1 * | 10/2003 | Kishi et al. | 345/107 |
| 7,119,759 | B2 | 10/2006 | Zehner et al. | |
| 2002/0175946 | A1 * | 11/2002 | Sakuta et al. | 345/778 |
| 2005/0024353 | A1 * | 2/2005 | Amundson et al. | 345/204 |
| 2005/0104843 | A1 * | 5/2005 | Schlangen | 345/107 |
| 2006/0262082 | A1 * | 11/2006 | Johnson et al. | 345/107 |
| 2010/0053230 | A1 * | 3/2010 | Verschueren | 345/690 |

FOREIGN PATENT DOCUMENTS

| | | | |
|---|---|---|---|
| WO | 9506307 | A1 | 3/1995 |
| WO | 2004066253 | A1 | 8/2004 |
| WO | 2005024770 | A1 | 3/2005 |
| WO | 2005071651 | A1 | 8/2005 |
| WO | 2006013502 | A1 | 2/2006 |
| WO | 2006061730 | A1 | 6/2006 |

OTHER PUBLICATIONS

Written Opion of the International Searching Authority for International Application No. PCT/IB2007/054803.

* cited by examiner

*Primary Examiner* — Alexander Eisen
*Assistant Examiner* — Amit Chatly

(57) ABSTRACT

A method of driving a display device uses a first display addressing mode, in which the display is addressed sequentially in rows, and wherein a first image is displayed with a first contrast ratio between the lightest and darkest pixels, and with a brightest pixel output state, a darkest pixel output state and a plurality of intermediate grey level output states. In a second mode, the display is addressed sequentially in rows, and a second image is displayed with a second contrast ratio between the lightest and darkest pixels which is greater than the first contrast ratio.

26 Claims, 9 Drawing Sheets

DISPLAY DEVICE USING MOVEMENT OF PARTICLES

FIELD OF THE INVENTION

This invention relates to a display device using movement of particles. One example of this type of display is an electrophoretic display.

BACKGROUND OF THE INVENTION

Electrophoretic display devices are one example of bistable display technology, which use the movement of charged particles within an electric field to provide a selective light scattering or absorption function.

In one example, white particles are suspended in an absorptive liquid, and the electric field can be used to bring the particles to the surface of the device. In this position, they may perform a light scattering function, so that the display appears white. Movement away from the top surface enables the color of the liquid to be seen, for example black. In another example, there may be two types of particle, for example black negatively charged particles and white positively charged particles, suspended in a transparent fluid. There are a number of different possible configurations.

It has been recognized that electrophoretic display devices enable low power consumption as a result of their bistability (an image is retained with no voltage applied), and they can enable thin and bright display devices to be formed as there is no need for a backlight or polariser. They may also be made from plastics materials, and there is also the possibility of low cost reel-to-reel processing in the manufacture of such displays.

One example of application of interest is electronic shelf labels. These offer retailers several advantages. First of all, price updates can be implemented at the touch of a button, whereas with the conventional paper shelf labels an employee needs to walk past all shelves and manually adjust the prices (time consuming and prone to errors). Secondly, electronic shelf labels offer the possibility to display relevant information only. For instance, outside opening hours, when the retailer is planning his shelf space, the electronic shelf label can display the shelf product layout, the current stock and the arrival date of the new supply. During opening hours the electronic shelf labels can display information relevant to the consumer, like product information, prices and special offerings.

If costs are to be kept as low as possible, passive (direct drive) addressing schemes are employed. The most simple configuration of display device is a segmented reflective display, and there are a number of applications where this type of display is sufficient. A segmented reflective electrophoretic display has low power consumption, good brightness and is also bistable in operation, and therefore able to display information even when the display is turned off.

However, improved performance and versatility is provided using a matrix addressing scheme. An electrophoretic display using passive matrix addressing typically comprises a lower electrode layer, a display medium layer, and an upper electrode layer. Biasing voltages are applied selectively to electrodes in the upper and/or lower electrode layers to control the state of the portion(s) of the display medium associated with the electrodes being biased.

One particular type of electrophoretic display device uses so-called "in-plane switching". This type of device uses movement of the particles selectively laterally in the display material layer. When the particles are moved towards lateral electrodes, an opening appears between the particles, through which an underlying surface can be seen. When the particles are randomly dispersed, they block the passage of light to the underlying surface and the particle color is seen. The particles may be colored and the underlying surface black or white, or else the particles can be black or white, and the underlying surface colored.

An advantage of in-plane switching is that the device can be adapted for transmissive operation, or transflective operation. In particular, the movement of the particles creates a passageway for light, so that both reflective and transmissive operation can be implemented through the material. This enables illumination using a backlight rather than reflective operation. The in-plane electrodes may all be provided on one substrate, or else both substrates may be provided with electrodes.

Active matrix addressing schemes are also used for electrophoretic displays, and these are generally required when a faster image update is desired for bright full color displays with high contrast and large number of greyscales. Such devices are being developed for signage and billboard display applications, and as (pixellated) light sources in electronic window and ambient lighting applications. Colors can be implemented using color filters or by a subtractive color principle, and the display pixels then function simply as greyscale devices. The description below refers to greyscales and grey levels, but it will be understood that this does not in any way suggest only monochrome display operation.

The invention applies to both of these technologies, but is of particular interest for passive matrix display technologies, and is of particular interest for in-plane switching passive matrix electrophoretic displays. In-plane electrophoretic displays are for example a promising technology for realizing electronic shelf labels. In addition to the advantages outlined above, this technology has a paperlike appearance with good readability at all angles that customers are used to.

Electrophoretic displays are typically driven by complex driving signals. For a pixel to be switched from one grey level to another, often it is first switched to white or black as a reset phase and then to the final grey level. Grey level to grey level transitions and black/white to grey level transitions are slower and more complicated than black to white, white to black, grey to white or grey to black transitions.

Typical driving signals for electrophoretic displays are complex and can consist of different subsignals, for example "shaking" pulses aimed at speeding up the transition, improving the image quality etc.

Further discussion of known drive schemes can be found in WO 2005/071651 and WO 2004/066253.

One significant problem with electrophoretic displays, and particularly passive matrix versions, is the time taken to address the display with an image. This addressing time results from the fact that the pixel output is dependent on the physical position of particles within the pixel cells, and the movement of the particles requires a finite amount of time. The addressing speed can be increased by various measures, for example providing pixel-by-pixel writing of image data which only requires movement of pixels over a short distance, followed by a parallel particle spreading stage which spreads the particles across the pixel area for the whole display.

Even with these measures, the display addressing for a large passive matrix display can take hours rather than minutes. This has limited the use of large electrophoretic displays to displays for static images and which are refreshed only infrequently, for example billboard applications.

Even in smaller displays, such as for the electronic shelf label application, with line-by-line passive matrix addressing of 100 rows of pixels with 300 micron pixel size, this will take roughly 15 minutes for a full image update. When the electronic shelf label is in the retailer mode, this is unacceptably slow.

There is therefore a need to reduce the addressing time for such passive matrix display devices.

WO 95/06307 discloses an electrophoretic display with reduced writing time, in which an image is sequentially enhanced by addressing the display with multiple short duration addressing signals.

SUMMARY OF THE INVENTION

According to the invention, there is provided a method of driving a display device comprising an array of rows and columns of display pixels, each pixel comprising particles which are moved to control the display state of the pixel, the method comprising, in a first mode, addressing the display sequentially in rows, and wherein a first image is displayed with a first contrast ratio between the lightest and darkest pixels possible in the first mode, and with a brightest pixel output state, a darkest pixel output state and a plurality of intermediate grey level output states; and, in a second mode, addressing the display sequentially in rows, and wherein a second image is displayed with a second contrast ratio between the lightest and darkest pixels possible in the second mode, which is greater than the first contrast ratio.

This method provides a high speed initial addressing mode, but one which retains a greyscale image content. The addressing is row by row so that the multiple columns in each row are addressed simultaneously in parallel.

In this way, the addressing time for the first addressing cycle is kept as short as possible, whilst enabling an image of a predetermined quality (as set by the contrast ratio) to be displayed. For passive matrix, the addressing cycle includes applying the required voltages on the electrodes and allowing the movement of particles, row after row. For active matrix, the addressing cycle includes applying the required voltages on the electrodes, row after row, but the movement of particles can occur for all rows simultaneously. And of course, it is possible to interchange rows and columns.

A further addressing mode preferably displays an image with a maximum number of grey levels. This maximum is the limit for the particular display.

The first mode can comprise a first display addressing cycle, and the second addressing mode then comprises at least one further display addressing cycle. The first display addressing cycle and the at least one further addressing cycle can then be for display of the same image content.

In this way, the progressive display operations can build up both the contrast ratio and the number of grey levels. However, the lower contrast ratio first image may already include the final number of grey levels (but more closely spaced than in the final image).

Alternatively, wherein the first and second modes can be used for displaying different image content. Thus, some display information may need to be updated rapidly but without the need for high contrast, whereas other display information requires better contrast but can be updated more slowly.

The first contrast ratio can be equal to or less than 6:1, or it may be equal to or less than 4:1, or even equal to or less than 2:1.

The method is preferably for driving an in-plane passive matrix electrophoretic display device.

The first addressing mode may comprise applying addressing voltages for time durations to cause movement of the electrophoretic particles, wherein the voltages are applied for at most a fraction of the time required for the electrophoretic particles of all grey levels to reach their desired states.

In this way, the state requiring greatest movement of particles cannot be reached, and this results in the loss of contrast. This could also represent a loss of brightness if the display operates with white particles on a black background.

As mentioned above, the first image can have the same number of grey levels as the second image.

The drive scheme may apply different voltages to different pixels in dependence on the pixel data, in order to provide greyscale levels.

The voltages for all pixels may be applied for a fraction of the time required for those pixels to reach their desired state. In this way, all pixels have their drive state modified. The fraction can be a constant, to provide linear scaling of the time of application of pixel voltages. Alternatively, the fraction can be a variable dependent on the image data to provide non-linear scaling of the time of application of pixel voltages. This can improve the appearance of the first image.

For example, the non-linear scaling can be adapted to provide constant perceived luminance difference between grey levels of the first image.

In an alternative arrangement, the voltages for all pixels are applied for as long as required for those pixels to reach their desired state up to a threshold time, to provide luminance capping. This scheme may result in some pixels reaching their desired state after the first addressing. During the at least one further display addressing cycle, only rows that require different image content to the image content that has already been written then need to be re-addressed.

When the different modes are for building up the same image, after the initial low contrast image, the at least one further display addressing cycle can comprise at least one additional contrast improvement cycle to increase the range of brightness of the pixels to be addressed to a lowest set of brightness levels, and at least one additional image correction cycle to correct errors in the pixels to be addressed to a middle set of brightness levels.

Each pixel can be driven to at most a maximum contrast level, but the method is for driving a display device in which each pixel comprises a number of particles which could enable a greater contrast level than the maximum contrast level. This represents an overfilling of the pixels (compared to the filling required to obtain the maximum contrast to which the display is driven), and this enables an increase in the drive speed. There may be between 5% and 15% overfilling.

The invention also provides an electrophoretic display device, comprising an array of rows and columns of display pixels, and a controller for controlling the display device, wherein the controller is adapted to implement the method of the invention.

The invention also provides a display controller for an electrophoretic display device, adapted to implement the method of the invention.

BRIEF DESCRIPTION OF THE DRAWINGS

Examples of the invention will now be described in detail with reference to the accompanying drawings, in which.

Figure 1:
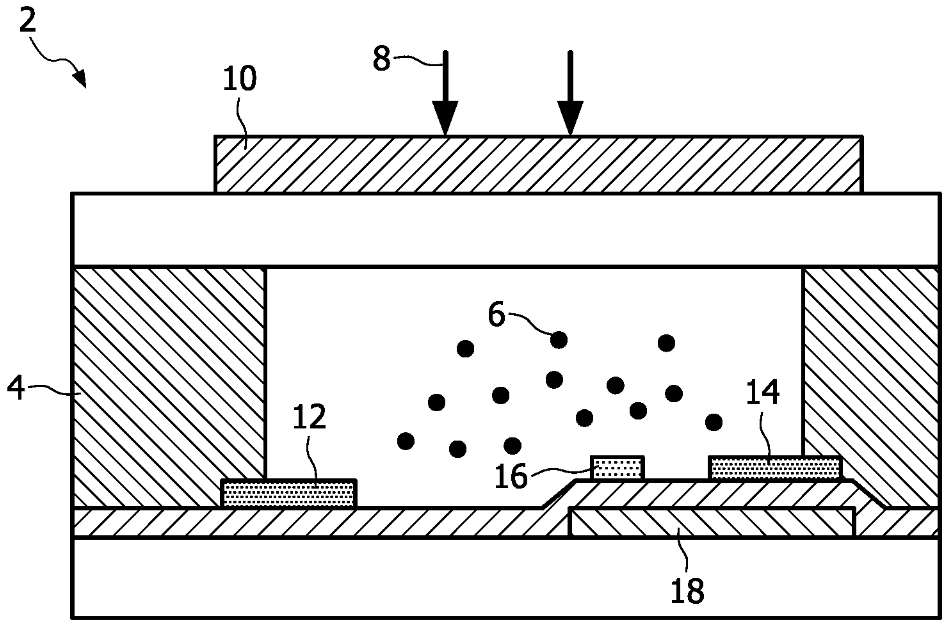
FIG. 1 shows schematically one known type of device to explain the basic technology.

It should be noted that these figures are diagrammatic and not drawn to scale. Relative dimensions and proportions of parts of these figures have been shown exaggerated or reduced in size, for the sake of clarity and convenience in the drawings. The same references are used in different figures to denote the same layers or components, and description is not repeated.

DETAILED DESCRIPTION OF THE EMBODIMENTS

The invention provides a display device and drive method in which a first display addressing cycle is used to display a first image with a first low contrast ratio and at least one further display addressing cycle displays an image with a higher contrast ratio. This reduces the addressing time to obtain an initial lower quality output image.

Before describing the invention in more detail, one example of the type of display device to which the invention can be applied will be described briefly.

FIG. 1 shows an example of the type of display device 2 which will be used to explain the invention, and shows one electrophoretic display cell of an in-plane switching passive matrix transmissive display device.

The cell is bounded by side walls 4 to define a cell volume in which the electrophoretic ink particles 6 are housed. The example of FIG. 1 is an in-plane switching transmissive pixel layout, with illumination 8 from a light source (not shown), and through a color filter 10.

The particle position within the cell is controlled by an electrode arrangement comprising a common electrode 12, a storage electrode 14 which is driven by a column conductor and a gate electrode 16 which is driven by a row conductor. Optionally the pixels may comprise one or more additional control electrodes, for example positioned between the common and gate electrode in order to further control the movement of the particles in the cell.

The relative voltages on the electrodes 12, 14 and 16 determine whether the particles move under electrostatic forces to the storage electrode 14 or the drive electrode 12.

The storage electrode 14 (also known as a collector) defines a region in which the particles are hidden from view, by a light shield 18. With the particles over the storage electrode 14, the pixel is in an optically transmissive state allowing the illumination 8 to pass to the viewer on the opposite side of the display, and the pixel aperture is defined by the size of the light transmission opening relative to the overall pixel dimension. Optionally, the display could be a reflective device with the light source being replaced by a reflective surface.

In a reset phase, the particles are collected at the storage electrode 14. The addressing of the display involves driving the particles towards the electrode 12 so that they are spread within the pixel viewing area.

FIG. 1 shows a pixel with three electrodes, and the gate electrode 16 enables independent control of each pixel using a passive matrix addressing scheme.

FIGS. 2 to 5 are used to explain in more detail the operation of a slightly different three electrode pixel, and show a pixel layout in plan view.

Figure 2:
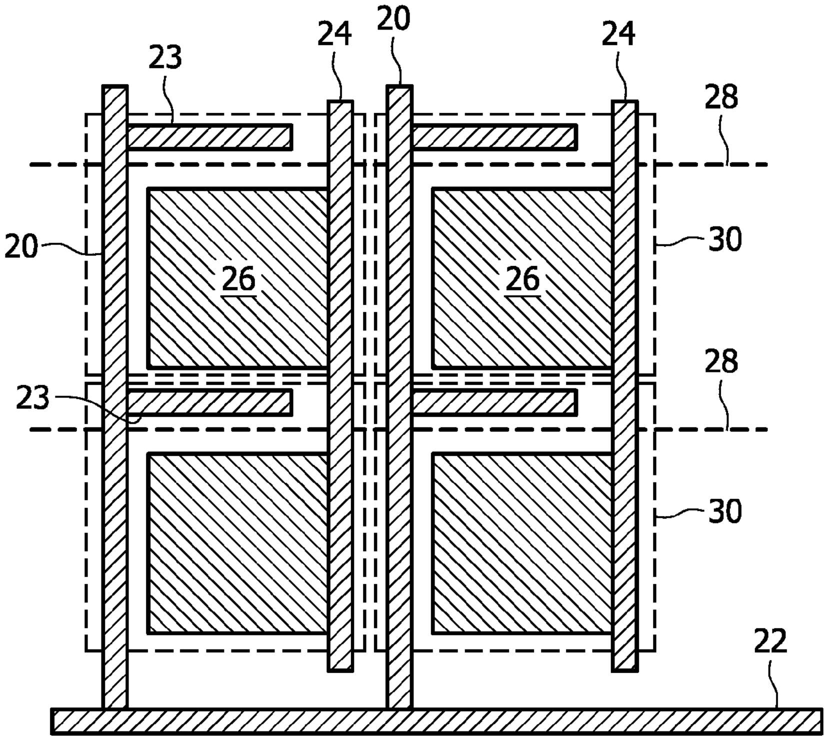
FIG. 2 shows another known type of device in plane view to which the invention can be applied.

In FIG. 2, first column electrodes 20 connect to a common reservoir electrode 22. The column electrodes 20 include spurs 23. Second column electrodes (data electrodes) 24 connect to pixel electrodes 26, and gate/select electrodes 28 run in the row direction. There are again three electrodes per pixel. In this example, the storage electrodes 23 are arranged as a common electrode, and the pixel electrode 26 are coupled to data columns.

The pixel electrode is used to move the particles into the visible portion of the pixel, and in FIG. 2 the pixel electrode 26 is shown to occupy most of the pixel area. Each pixel area is shown in FIG. 2 as area 30, and the different pixel areas can be physically separated from each other The reservoir electrode 20, 22, 23 is used to move the particles laterally to the hidden portion of the pixel. The gate electrode 28 is used to prevent movement of the particles from the reservoir portion into the visible portion of the pixel in all lines other than the selected line, and thus enables row by row operation of the pixels.

The gate electrode 28 operates to interrupt the electric field between the reservoir electrode and the pixel electrode, so that a driving voltage on the pixel electrode only causes movement of particles for a selected row, for which the electric field is not interrupted.

This gate electrode 28 is required as a result of the passive addressing scheme, and is needed to provide different conditions to a selected row than to non-selected rows.

Figure 3:
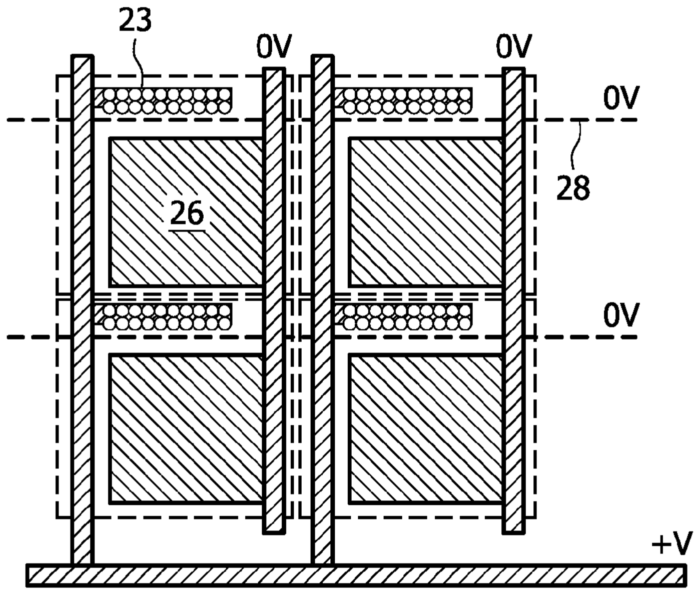
FIGS. 3 to 5 show how the display device of FIG. 2 is operated.
Figure 4:
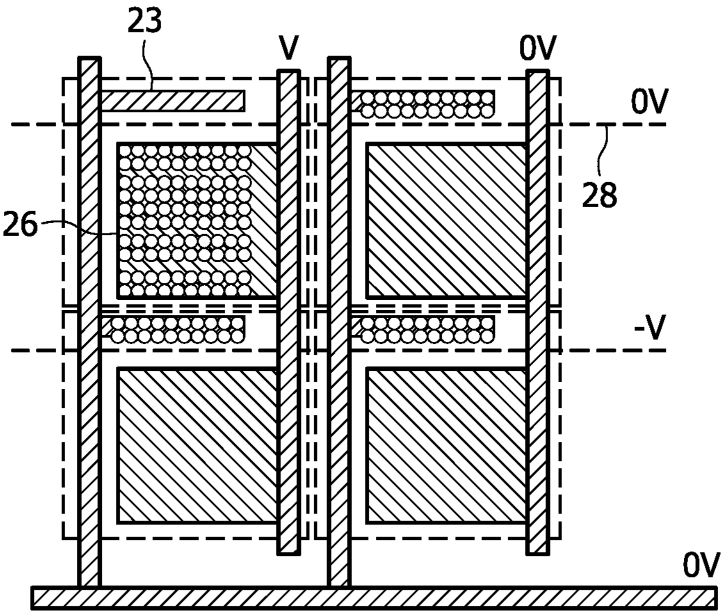
Figure 5:
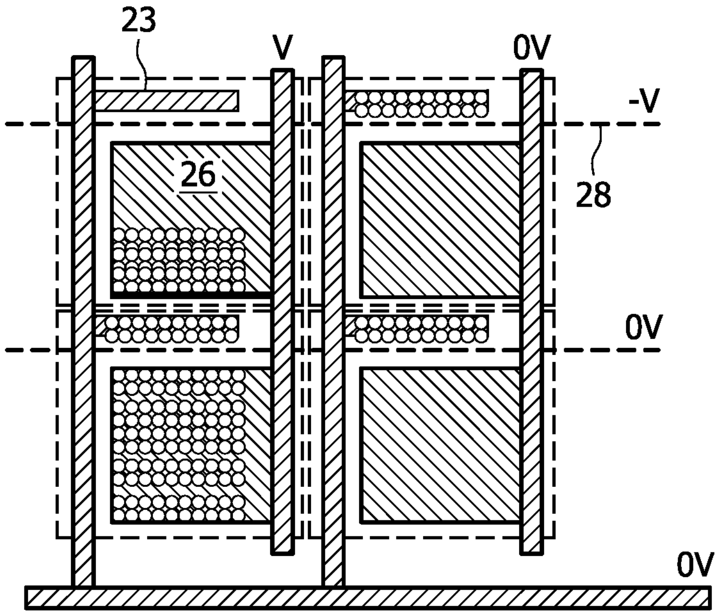

FIGS. 3 to 5 show one example of how voltages can be applied to the three electrodes of the pixel design of FIG. 2, and show how the charged particles move. For explanation, the pixels of the left column are to be "written" which means that the particles are to be moved to the pixel electrode, whereas the pixels of the right column are to be "non written" which means that the particles are to stay in the reservoir, in the vicinity of the electrodes 23.

For explanation, the particles are assumed to have a negative charge, and the common reservoir electrode has a reference voltage of 0 V for normal addressing.

The first step, of FIG. 3, is to perform a global reset phase. This can be achieved by providing a high voltage on the reservoir electrodes 23 as shown (+V) with the other electrodes at 0 V.

All gate electrodes are then set to a negative voltage (−V), and the reservoir electrodes are returned to the reference voltage, of 0 V in this example. This prevents particles moving from the reservoir 23 to the pixel electrode and sets up a barrier to the movement of particles out of the reservoir.

To perform the line by line addressing of the pixels, the voltage of the gate electrode 28 of the selected line is set to a less negative voltage, for example 0 V. FIG. 4 shows the addressing of the top row, and FIG. 5 shows the addressing of the bottom row. When a line is selected, those pixel electrodes with a positive voltage cause particles to move into the pixel, whilst those pixels with pixel electrode voltage at 0 V are not filled, as can be seen in FIG. 4. Thus, the data line (which connects to the pixel electrode 26) for a pixel which is to be written is provided with a positive voltage (V).

As can also be seen in FIG. 4, the gate electrode 28 for the non-selected row prevents any movement of particles, even for a data column which has the positive write voltage. In other words, the bottom left pixel of FIG. 4 is not yet written, because the row is not selected, and the gate electrode 28 acts as a barrier preventing the movement of the particles away from the electrode 23.

After pixel filling is completed, the gate electrode returns to a negative voltage, and the following line is selected and pixels of the next line are filled, if required. This is shown in FIG. 5.

Additional phases may be used in the drive scheme, such as shaking pulses before the writing of data into a pixel. However, the update time is dominated by the addressing phase shown in FIGS. 4 and 5, during which particles are selectively moved from the storage electrode to the pixel electrode. This addressing time scales with the number of lines present in the display. Shortening the line time can therefore have a significant influence on the update speed of the display.

The invention provides a drive method which provides partial filling. In particular, if a shorter addressing time is used, there will not be a complete transfer of particles from the common electrode 23 to the pixel electrode 26. The invention recognizes that a partial transfer can be controlled to enable a low contrast initial image to be formed, but which maintains grey level detail. In particular, a high speed update can give a lower contrast than the final display state, but maintain at least one intermediate grey level state between the brightest and darkest pixel states.

Figure 6:
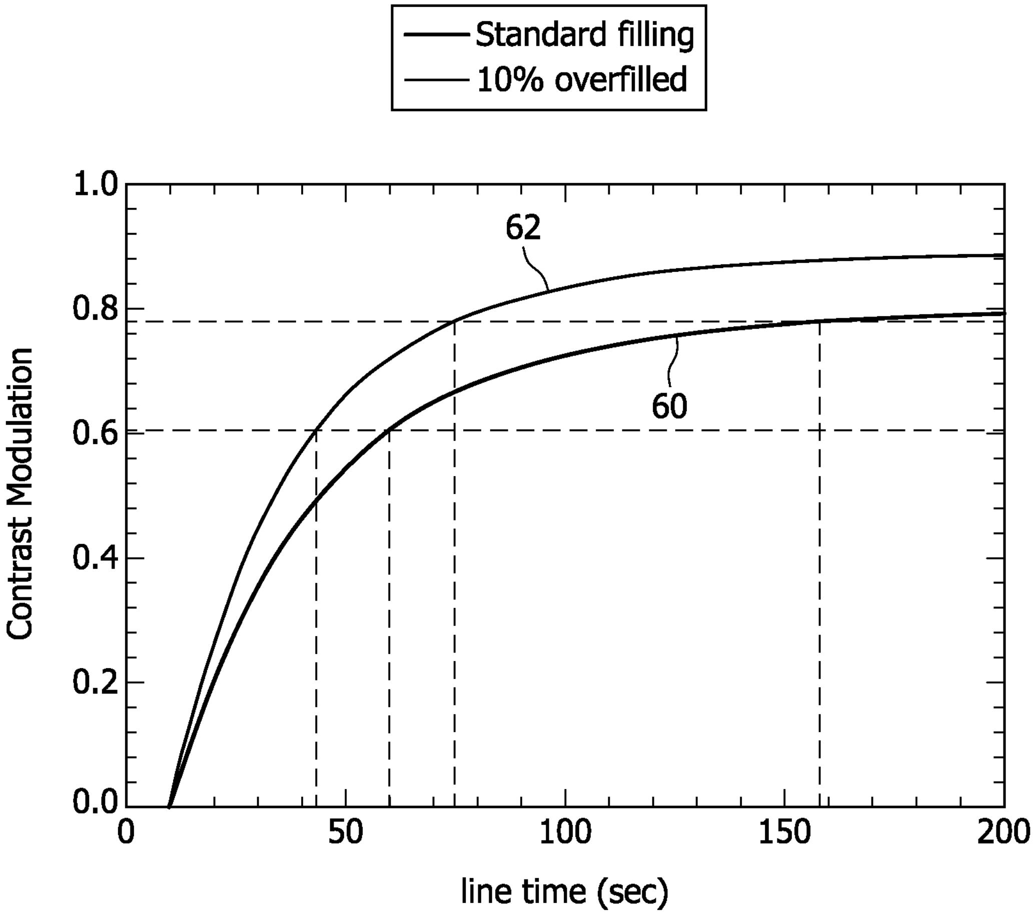
FIG. 6 shows the relationship between a contrast of an image and the line time used to generate the image.

FIG. 6 shows a graph of contrast modulation versus line time to show how reducing the line time generally influences the contrast of the displayed image.

Line 60 shows a standard filling rate up to a contrast ratio of 9:1. Line 62 shows the response of a display with 10% more particles. This overfilling of the pixels gives a number of particles which could enable a greater contrast than the maximum contrast to which the display is in fact driven, and FIG. 6 shows how this overfilling enables a reduction in time to address the display.

The contrast modulation is defined as (Lwhite−Lblack)/(Lwhite+Lblack) where Lwhite and Lblack are the luminance values of the white and black states. Contrast modulation is plotted as it is a better approximation of the perceived contrast than contrast ratio.

Line 60 shows the behavior for a standard cell, with a particle concentration optimized for a contrast of 9:1. The time scale on the x-axis is arbitrary, but the example shown has a time to reach a contrast of 8:1 of about 160 seconds. The dashed vertical lines indicate times to reach contrast ratios of 8:1 (contrast modulation=0.778) and 4:1 (contrast modulation=0.6).

The calculated behavior is shown assuming the filling speed is a function of the amount of particles left on the common electrode, which gives an exponential behavior. Furthermore, the luminance is an exponentially decreasing function of the amount of filling.

Finally, a time lag is taken into account of 10 seconds, because it takes some time before the first particles have crossed the gate electrode. This can be seen as the point on the time axis when the contrast begins to vary.

Line 62 shows the contrast vs. time for a cell with 10% more particles in the suspension. This enables the line time to be approximately 2.5 times shorter than normal to reach a contrast of 8:1.

The invention is based on the recognition that a lower contrast is sufficient for a first image. For example, a contrast of 4:1 (contrast modulation of 0.6) for the first frame can be considered to be sufficient. In this case, the time needed becomes 43 seconds for an overfilled particle cell, or 60 seconds for a standard cell. This gives a speed improvement of a factor of 3.7 for the overfilled case, and 2.7 for the standard case.

This contrast ratio of 4:1 represents a readable image, for example sufficient for newspaper print in an electronic paper application. The ratio can be lower, for example 2:1, depending on the application. In a subsequent frame, more particles can be driven into the viewing part of the pixel to improve the contrast ratio.

Of course, further time reductions can be obtained by reducing further the contrast of the initial image, for example to a contrast modulation of 0.4 or lower.

There are a number of ways in which the reduced contrast image can be generated in a shorter time.

There are basically two ways to generate greyscales in the in-plane electrophoretic display. One is to vary data pulse widths during the addressing phase for a fixed voltage level, and the other is to vary the data voltage levels.

A. Voltage Level Variation

If data voltage level variation is used as the way of generating greyscales, so that different pixels are driven with different voltages, then driving the display with a shorter line time, but keeping the voltages the same, will lead to a lower contrast ratio. All desired final greyscales will be different from the greyscales after the final frame, and the first frame then represents an image which is essentially a scaled version of the final image, in terms of the amount of pixel filling.

Figure 7:
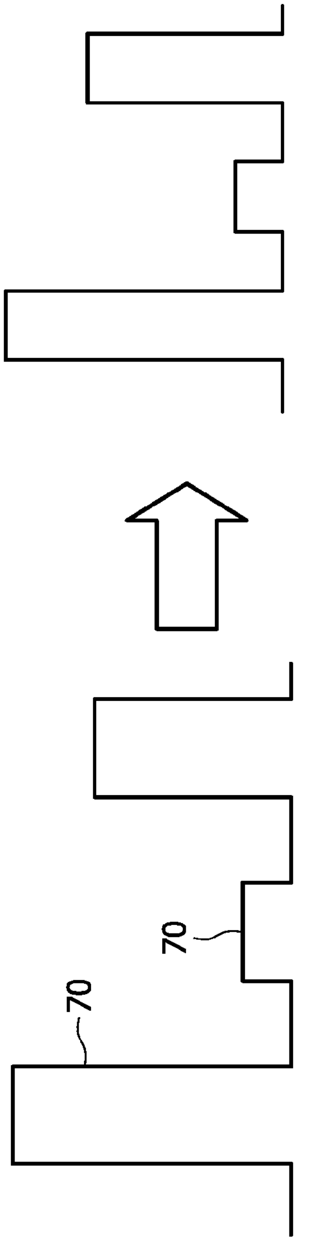
FIGS. 7 to 10 show different schemes for modifying display data to provide a low contrast image.

The way the driving signals are varied is shown schematically in FIG. 7, which shows voltage pulses 70 of equal time duration but different height. These are compressed along the time axis.

The applied voltages can however be varied in a more complicated way than simple scaling, and this may be desirable to bring the brighter greyscales closer to their final value. Depending on the image content, this will lead to a more pleasant picture than keeping the voltages the same.

Figure 8:
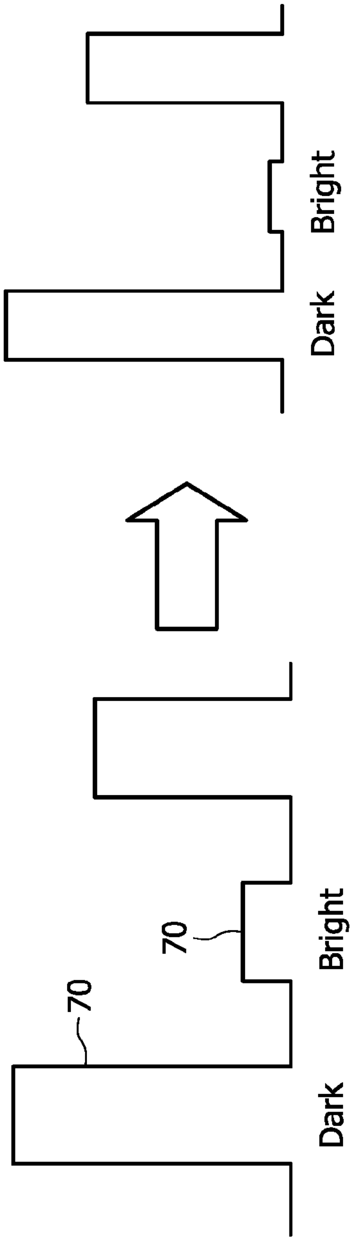

FIG. 8 shows an example of this, in which the brighter pixels have no particles moved initially, to improve the contrast.

In this case, for any selected line time, the way a particular voltage is adjusted will depend on the grey level, and to do this a mapping must take account of the particular grey level and the selected line time, so that the desired voltage can be determined based on the available line time and the desired grey level.

B. Pulse Length Variation

If data pulse length variation is used as the way of generating greyscales, then there is a single mapping curve from the initial pulse length to the final pulse length for each selected line time.

Figure 9:
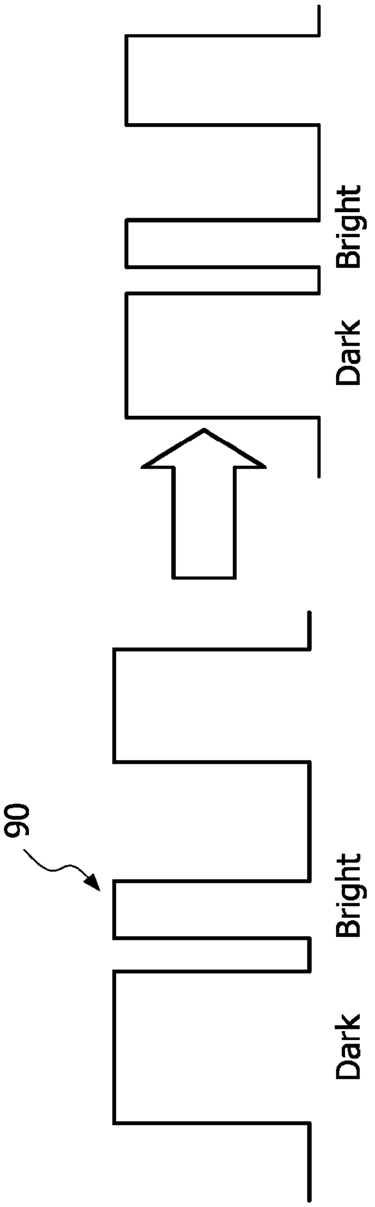

In this case, driving the display with a shorter line time can be done in different ways:

(i) All data pulse lengths can be scaled linearly, as schematically shown in FIG. 9, which shows fixed voltage pulses 90. This will lead to an image with a lower contrast and the same number of greyscales, compared to the final image. The differences in L* (perceived brightness) between the grey levels will not however be proportional to the differences in L* after the final frame. As with linear voltage scaling, the first image will effectively comprise a scaled version of the final image in terms of the pixel filling level, and all lines will need to be addressed in the subsequent frames.

(ii) All data pulse lengths can be scaled in a non-linear fashion to achieve constant perceived brightness L* between the grey levels, just as in the final frame. This will still give an image with a lower contrast and the same number of greyscales, compared to the final image. Again, all lines will need to be addressed in the subsequent frames. The perceived contrast level between grey levels does not scale linearly, and this is why a scaling to achieve constant perceived grey level steps is not a simple linear scaling.

Figure 10:
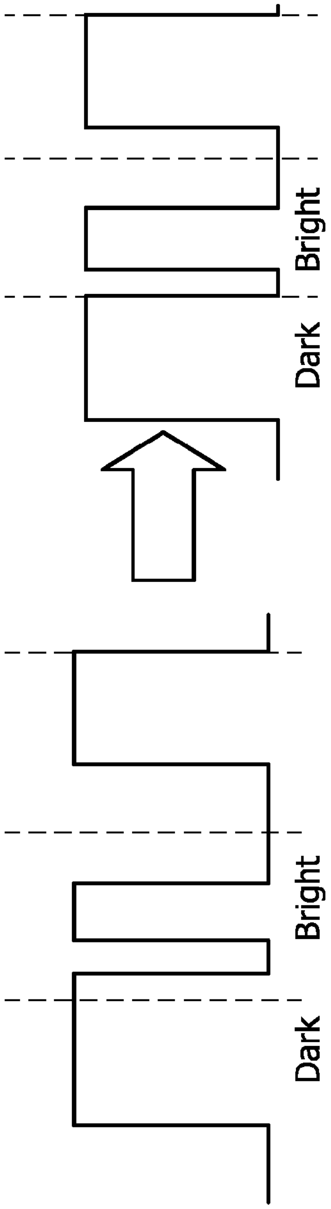

(iii) Only those data pulses which are longer than the shortened line time are clipped to the line time. This is shown in FIG. 10. The dotted line shows the cutoff time, and in the example shown, the first, dark pixel has its pulse duration clipped, the second, bright pixel does not have its pulse duration clipped, and the third pixel is at the limit and thus does not have its pulse duration clipped. This represents a light capping function, which in particular caps pixels which are to be darker than a threshold to that threshold. This leads to an image with a lower number of greyscales, compared to the final image. The advantage of this scheme is that in the subsequent frames, only the lines containing pixels with the lowest grey levels (which are to be darkest and which were clipped in the first frame) need to be addressed.

There are also a number of options for building up an image in multiple frames, regardless of the way the first image has been prepared.

In one example, the low contrast image is first prepared, with as many greyscales as necessary to lead to a pleasant image. The line time is short to give a fast update.

In the next update, the contrast is improved by lowering the luminance of the pixels with the lowest grey levels. For this update, not all lines need to be addressed, which leads to a relatively fast contrast improvement.

Finally, errors in the mid-grey pixels can be corrected, and again not all lines need to be addressed.

This way of building up the frame can be achieved both by varying the voltages and/or the pulse lengths of the data pulse in the first step. The three steps may consist of multiple addresses each.

It is also possible to mix the different steps. For example, certain parts of the display only need a contrast improvement addressing step, and contain very few greyscales, but another part of the image may have a large number of greyscales and is improved most by applying a grey level correction step after the initial low contrast addressing, and before a contrast improvement step.

The exact applied scheme may be dependent on the image content and may differ for every single line of the panel, and may be calculated off-line in a central computer processing the images for many displays.

For a display with overfilling (for example 10% extra particles that are required for the pixel to be able to attain a desired contrast level, as explained above), it is possible to achieve a larger final contrast than the display filled with the standard amount, but it may not be necessary to drive the panel to the maximum contrast every time.

The invention has been described above in connection with a simple three electrode pixel design. However, it will be understood that the invention can be applied to many pixel designs.

Figure 11:
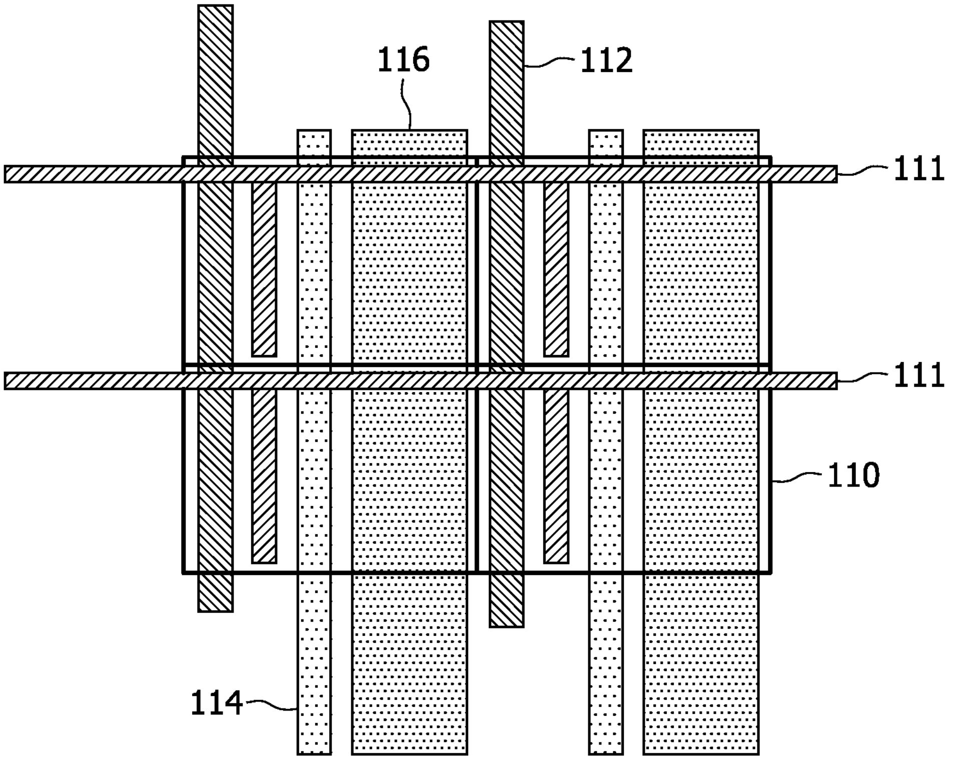
FIG. 11 shows another example of pixel electrode layout.

For example, more complicated pixel electrode designs are possible, and FIG. 11 is one example.

As shown in FIG. 11, each pixel 110 has four electrodes. Two of these are for uniquely identifying each pixel, in the form of a row select line electrode 111 and a write column electrode 112. In addition, there is a temporary storage electrode 114 and the pixel electrode 116.

In this design, the pixel is again designed to provide movement of particles between the vicinity of the control electrodes 111,112 and the pixel electrodes 116, but an intermediate electrode 114 is provided, which acts as a temporary storage reservoir. This allows the transfer distance during the line-by-line addressing to be reduced, and the larger transfer distance from the temporary electrode 114 to the pixel electrodes 116 can be performed in parallel. FIG. 11 shows the pixel area as 110.

The addressing period can thus proceed faster, due to the fact that the distance to travel is reduced and the particle velocity is increased due to increased electric field.

Figure 12:
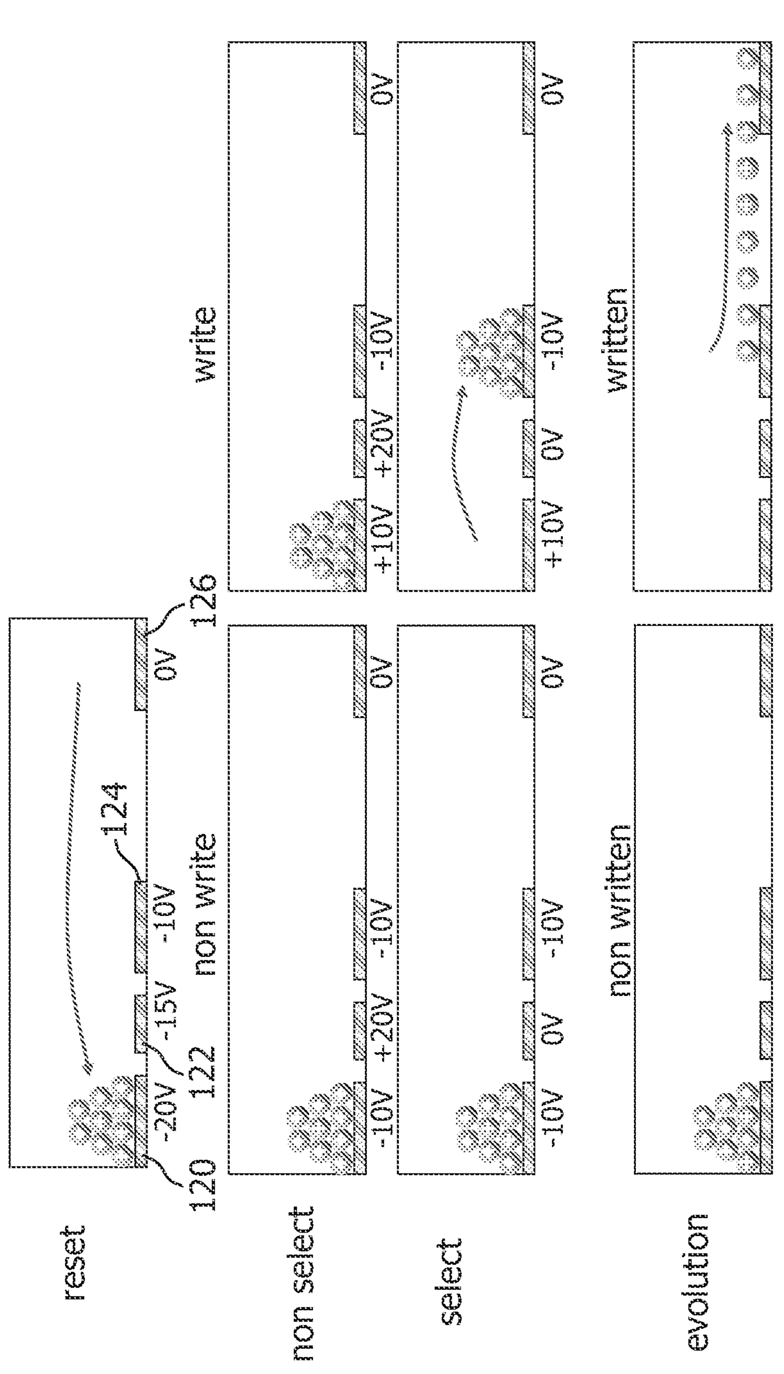
FIG. 12 shows how a further pixel layout, similar to FIG. 11, is driven.

Other electrode designs and drive schemes are also possible. FIG. 12 is used to explain the operation of an electrode layout similar to FIG. 11. There is a collector electrode 120, a gate electrode 122, and two pixel electrodes 124, 126. The first of these 124 can be considered as a temporary storage electrode as explained with reference to FIG. 11.

The right column of images shows the sequence of voltages for a pixel which has its particles driven into the viewing area, and the left column of images shows the sequence of voltages for a pixel to remain with particles in the collector area.

First, in the reset phase the particles (assumed to be positively charged) are all drawn to the collector electrode 120, for all pixels simultaneously.

Then, a row at a time, each row is selected by lowering the gate voltage compared to row which is not selected. In the example shown, the selected row ("select") has a gate voltage of 0 V whereas the non-selected row ("non select") has a gate voltage of +20 V. The pixel which is not to be written has a collector voltage of −10V and the pixel to be written has a collector voltage of +10 V. As shown schematically, only the pixel to be written and in a selected row has particle movement towards the first pixel electrode 124, acting as a temporary storage electrode. It is also possible to set the voltage of the second pixel electrode 126 lower than the first, in which case the particles will be transported further towards the second pixel electrode 126.

The full display is addressed in this way.

In the following evolution phase, for all pixels simultaneously, the particles that are written to the first pixel electrode 124 (or alternatively the second pixel electrode 126) are spread between the two pixel electrodes, as schematically shown, by making the voltages equal.

In this example, the collector electrodes are part of column data voltages lines, and the gate electrodes are part of row select voltage lines. It is instead possible to wire the collector electrodes as rows and the gate electrodes as columns. In typical electronic shelf labels, the number of (vertical) columns is much larger than (horizontal) rows, and therefore the total update time is lowest if the columns are used for data and the rows for selection.

The embodiments of the invention described above provide a low contrast initial image. This can be used as a draft preview mode for the electronic label application described above, to allow for a preview of the image in reduced quality. This can result in a 10 times reduction of the update time, while the image contrast is still sufficient for readability (for example a contrast ratio of 2:1).

The reduction in time obtained for the initial low contrast mode can be proportionately greater than the loss in contrast. This is based on the understanding that both the particle transfer and the eye characteristics are highly nonlinear. For example, with only 10% of the line-time, roughly 25% of the particles can be transported, generating a perceived contrast (L*) of 40% of the maximum achievable contrast.

Figure 13:
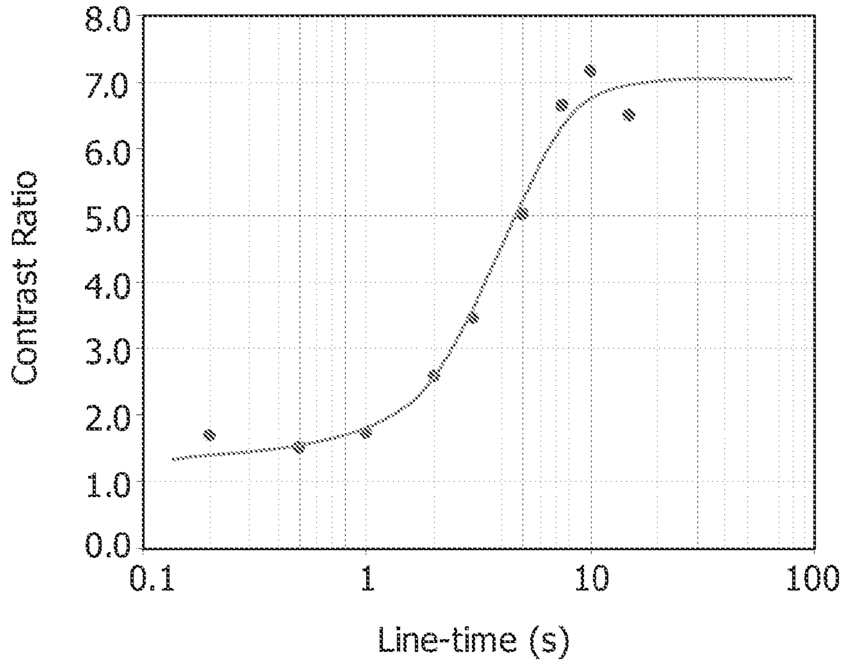
FIG. 13 shows a relationship between image quality and line time for a device corresponding to FIG. 12.

The relation between this line-time and resulting image quality is highly non-linear, as shown in FIG. 13, which represents the relation between image quality and line-time.

Experimental results show that a 10 times reduction in the line-time (for example from 10 s to 1 s) results in a loss of contrast from 7:1 down to 2:1. This is a smaller loss than expected, and corresponds to the transport of roughly 25% of all particles as mentioned above. In addition, for the observer, a 2:1 contrast is good enough to inspect the image. Indeed, expressing optical contrast as the luminance ratio of the bright state and the dark state does not accurately reflect the quality of how an image is perceived by the human eye. It is better to express the luminance values in L* values as outlined above, and then it follows that a 2:1 contrast for the viewer is perceived as 40% of the range of a 7:1 contrast.

The application of the invention to an electronic label will now be discussed in more detail. For a typical electronic shelf label, the width of the display will be much longer than the height, to match the shape of the shelves. For a passive matrix addressing it is most feasible to position the (selection) rows running along the largest dimension, and the (data) columns along the shortest. A typical electronic shelf label with dimensions of 100 cm×3 cm can then contain 3000 columns and 100 rows.

The lower contrast initial image can then be a review image, which allows the user to check the information content, without needing a maximum quality image. The subsequent full quality image does not necessarily need to be provided immediately after, and there can be a delay between the first display addressing mode of the invention and the at least one further display addressing mode. For example, the high contrast image can be the next day, and can be for a different image to that used in the low contrast mode.

The examples above use gate electrodes to enable independent addressing of pixels. It is known that passive matrix schemes can use a threshold voltage response to allow the addressing of one row of pixels not to influence the other rows that have already been addressed. In such a case, the combination of row and column voltages is such that the threshold is only exceeded at the pixels being addressed, and all other pixels can be held in their previous state. The invention can also be applied to display devices using a threshold response as part of the passive matrix addressing scheme. This may be instead of or as well as the use of gate electrodes as described above.

The invention is of most benefit to passive matrix displays, and to in-plane switching display technologies.

Figure 14:
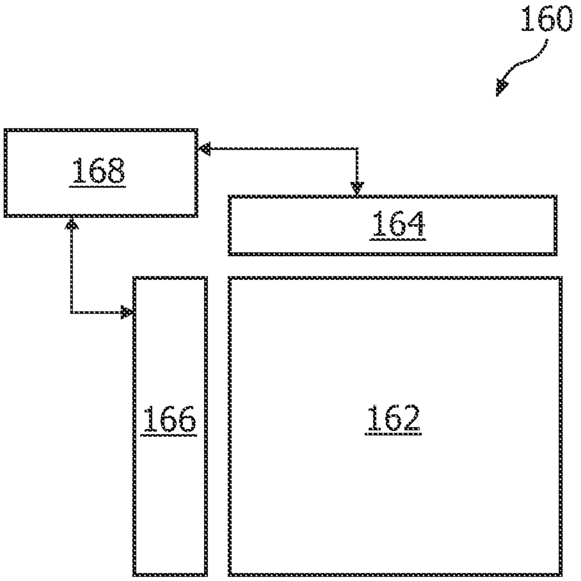
FIG. 14 shows a display device of the invention.

FIG. 14 shows schematically that the display 160 of the invention can be implemented as a display panel 162 having an array of pixels, a row driver 164, a column driver 166 and a controller 168. The controller implements the drive scheme of the invention, and in one example can implement different drive schemes according to a target line time for the first addressing cycle.

The invention can be applied to many other pixel layouts, and is not limited to electrophoretic displays or to passive matrix displays. The invention is of particular interest for passive matrix displays as these have long addressing times, but advantages can also be obtained for active matrix displays.

The first image displayed is a low contrast image, but which retains greyscale values. The number of greyscales will depend on the scheme chosen, but will typically be at least half the number in the final image.

The invention can be applied to many different applications, including the electronic label example described, but more generally any application where an increase in drive speed is desired.

The term "row" is somewhat arbitrary in this text and should not be understood as limited to a horizontal direction. Instead, the row-by-row addressing simply refers to a line by line addressing sequence. The row may run top to bottom of the display or side to side, and is a line of pixels which can be addressed in parallel.

While the invention has been illustrated and described in detail in the drawings and foregoing description, such illustration and description are to be considered illustrative or exemplary and not restrictive; the inventions is not limited to the disclosed embodiments. Variations to the disclosed embodiments can be understood and effected by those skilled in the art in practicing the claimed invention, from a study of the drawings, the disclosure, and the appended claims. In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of driving a display device, comprising acts of:

providing a passive matrix electrophoretic display having a plurality of pixels formed in an array of rows and columns, each pixel comprising a plurality of particles and brightest, darkest, and a plurality of intermediate grey level output states, in an initial mode addressing the pixels simultaneously in a plurality of columns and sequentially in rows for an initial duration sufficient to display an initial image with a first contrast ratio between the brightest and darkest output states, the display retaining the initial image greyscale; and in a further mode addressing the pixels sequentially in rows to display a further image with a second contrast ratio between the brightest and darkest output states greater than the first contrast ratio, wherein the initial and further modes comprise a first drive phase in which particles are driven row-by-row from a collector electrode to a temporary storage electrode; and a second drive phase in which particles for the whole display are moved in parallel from the temporary storage electrode to the viewing area.

2. The method as claimed in claim 1, wherein the initial mode comprises a first initial addressing cycle and the further mode comprises a first further addressing cycle.

3. The method as claimed in claimed in claim 2, wherein the first initial addressing cycle and the first further addressing cycle display a same image.

4. The method as claimed in claim 2, wherein the first further addressing cycle displays the further image with a maximum number of grey levels.

5. The method as claimed in claim 1, wherein the initial and further images are different.

6. The method as claimed in claim 1, wherein the first contrast ratio is equal to or less than 4:1.

7. The method as claimed in claim 1, wherein the first contrast ratio is equal to or less than 2:1.

8. The method as claimed in claim 1, wherein the first contrast ratio is equal to or less than 6:1.

9. The method as claimed in claim 1, wherein the display device includes an active matrix electrophoretic display device.

10. The method as claimed in claim 1, wherein the display device is an in-plane switching electrophoretic display device.

11. The method as claimed in claim 1, wherein in the initial mode addressing is achieved by applying voltages to cause movement of the electrophoretic particles, and the initial duration is at most a fraction of time required for the electrophoretic particle of all grey levels to reach desired states.

12. The method as claimed in claim 1, wherein the initial image includes the same number of grey levels as the further image.

13. The method as claimed in claim 11, wherein different voltages are applied to different pixels to provide greyscale levels in dependence on the pixel data of the initial image.

14. The method as claimed in claim 11, wherein the voltages for all pixels are applied for a fraction of time required for those pixels to reach a desired state.

15. The method as claimed in claim 14, wherein the fraction of time is a constant, providing linear scaling of the time of application of voltages.

16. The method as claimed in claim 14, wherein the fraction of time is a variable dependent on an image to provide non-linear scaling of the time of application of voltages.

17. The method as claimed in claim 16, wherein the non-linear scaling is adapted to provide constant perceived luminance difference between grey levels of the image.

18. The method as claimed in claim 16, wherein the voltages for all pixels are applied for as long as required for those pixels to reach a desired state up to a threshold time, to provide luminance capping.

19. The method as claimed in claim 1, wherein during the further mode, addressed is performed only on rows that require a different image.

20. The method as claimed in claim 1, wherein the further mode comprises a second further addressing cycle to increase the range of the brightness of one more pixels to a lowest set of brightness levels, and a third further addressing cycle to correct errors in one or more pixels to a middle set of brightness levels.

21. The method as claimed in claim 1, wherein each pixel is driven to a maximum contrast level, and comprises a number of the plurality of particles sufficient to enable a greater contrast level than the maximum contrast level.

22. The method as claimed in claim 21, wherein the number of the particles is between 5% and 15% more than required to enable the maximum contrast level.

23. The method as claimed in claim 1, wherein the initial and further modes each comprise a first drive phase for driving the particles row-by-row from a collector electrode to a temporary storage electrode; and a second drive phase for moving the particles for the whole display in parallel from the temporary storage electrode to the viewing area.

24. An electrophoretic display device, comprising:

a passive matrix electrophoretic display having a plurality of pixels formed in an array of rows and columns, each pixel comprising a plurality of particles and brightest, darkest, and a plurality of intermediate grey level output states; and a controller configured to control the display device to:

in an initial mode addressing the display pixels simultaneously in a plurality of columns and sequentially in rows for an initial duration sufficient to display an initial image with a first contrast ratio between the brightest and darkest output states, the display retaining the initial image greyscale; and in a further mode addressing the pixels sequentially in rows to display a further image with a second contrast ratio between the brightest and darkest output states greater than the first contrast ratio, wherein the initial and further modes comprise a first drive phase in which particles are driven row-by-row from a collector electrode to a temporary storage electrode; and a second drive phase in which particles for the whole display are moved in parallel from the temporary storage electrode to the viewing area.

25. The device as claimed in claim 24, wherein each pixel is configured to be driven to a maximum contrast level, and wherein each pixel comprises a number of the plurality of particles which could enable a greater contrast level than the maximum contrast level.

26. A display controller for a display device including a passive matrix electrophoretic display having a plurality of pixels formed in an array of rows and columns, each pixel comprising a plurality of particles and brightest, darkest, and a plurality of intermediate grey level output states, the controller is configured to control the display device by in an initial mode addressing the pixels simultaneously in a plurality of columns and sequentially in rows for an initial duration sufficient to display an initial image with a first contrast ratio between the brightest and darkest output states, the display retaining the initial image greyscale, and in a further mode addressing the pixels sequentially in rows to display a further image with a second contrast ratio between the brightest and darkest output states which is greater than the first contrast ratio, wherein the initial and further modes comprise a first drive phase in which particles are driven row-by-row from a collector electrode to a temporary storage electrode; and a second drive phase in which particles for the whole display are moved in parallel from the temporary storage electrode to the viewing area.

* * * * *